United States Patent [19]

Niessner et al.

[11] Patent Number: 5,276,256
[45] Date of Patent: Jan. 4, 1994

[54] FLAMEPROOFED CHLORINE-AND BROMINE-FREE MOLDING COMPOSITION

[75] Inventors: Norbert Niessner, Friedelsheim; Rainer Neumann, Mutterstadt; Karl Ruppmich, Ludwigshafen; Friedrich Seitz, Friedelsheim; Doris Zeltner, Roemerberg, all of Fed. Rep. of Germany

[73] Assignee: BASF Aktiengesellschaft, Ludwigshafen, Fed. Rep. of Germany

[21] Appl. No.: 950,499

[22] Filed: Sep. 25, 1992

[30] Foreign Application Priority Data

Sep. 27, 1991 [DE] Fed. Rep. of Germany ....... 4132172

[51] Int. Cl.$^5$ ............................................. C08L 51/00
[52] U.S. Cl. ........................................ 525/67; 525/146; 525/287; 525/902; 524/140; 524/141; 524/143; 524/504; 524/537; 526/276; 526/277
[58] Field of Search .................. 525/67, 146, 902, 287; 524/140, 141, 143, 504, 537

[56] References Cited

U.S. PATENT DOCUMENTS

| | | | |
|---|---|---|---|
| 4,692,488 | 9/1987 | Kress et al. | 524/139 |
| 4,883,835 | 11/1989 | Buysch et al. | 524/504 |
| 4,920,166 | 4/1990 | Buysch et al. | 524/141 |
| 4,925,891 | 5/1990 | Kress et al. | 524/139 |
| 4,931,503 | 6/1990 | Boutni et al. | 525/67 |
| 4,983,658 | 1/1991 | Kress et al. | 525/67 |
| 4,988,748 | 1/1991 | Fuhr et al. | 524/141 |
| 5,061,745 | 10/1991 | Wittmann et al. | 524/139 |
| 5,219,907 | 6/1993 | Niessner | 525/67 |

FOREIGN PATENT DOCUMENTS 3523316 1/1987 Fed. Rep. of Germany .

Primary Examiner—John Kight, III
Assistant Examiner—Rachel Johnson
Attorney, Agent, or Firm—Keil & Weinkauf

[57] ABSTRACT

A molding composition containing, based on the total weight of the composition:
A) at least 40% by weight of at least one halogen-free polycarbonate;
B) 5–40% by weight of at least one halogen-free graft copolymer composed of;
1) 40–80% by weight of an elastomer with a glass transition temperature below 0° C., which elastomer is composed of, at least 50% by weight of a diene or of an at least $C_4$-alkyl acrylate, 1–40% by weight of a halogen-free phosphorus compound of the formula

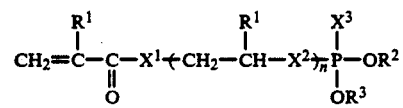

2) 20–60% by weight of a shell composed of, 40–98% by weight of styrene, α-alkylstyrene, nuclear-substituted styrene and/or $C_1$-$C_8$-alkyl (meth)acrylate, and 2–60% by weight of (meth)acrylonitrile and/or maleic anhydride;
C) 5–40% by weight of a halogen-free thermoplastic copolymer composed of, 50–95% by weight of styrene, α-alkylstyrene, nuclear-substituted styrene and/or $C_1$-$C_8$-alkyl (meth)acrylates, and 5–50% by weight of (meth)acrylonitrile and/or maleic anhydride;
D) 1–50% by weight of a halogen-free phosphorus compound of the formula

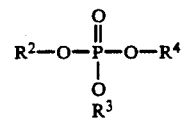

E) up to 5% by weight of a polytetrafluoroethylene with a median particle size of 50–2000 nm.

1 Claim, No Drawings

FLAMEPROOFED CHLORINE- AND BROMINE-FREE MOLDING COMPOSITION

The present invention relates to a chlorine- and bromine-free flameproofed molding composition. Chlorine- and bromine-free molding compositions based on ABS or ASA blends with PC (polycarbonate) are disclosed, for example, in the following publications:
(1) DE-A 35 23 314
(2) DE-A 35 23 316
(3) DE-A 38 19 081
(4) DE-A 38 24 356
(5) DE-A 36 28 904
(6) EP-A 287 895
(7) EP-A 286 965

Employed besides organic phosphates for the flameproofing are fiber-forming PTFE polymers. Although blends of this type have a good flame-retardant action, their notched impact strength is inadequate. In addition, the amount of organic phosphorus compounds needed for classification as UL 94 results in a considerable reduction in the heat resistance. For this reason, (4) proposes specific phosphates which ensure an increased Vicat softening point despite the flameproofing being good: these specific phosphates are, however, not commercially available and are elaborate to prepare. In addition, blends containing these phosphates still have insufficient notched impact strength.

Phosphates which have vinyl double bonds are commercially available and can, according to the manufacturers, be employed for flameproofing. However, nothing is known about their effect in PC/ABS and PC/ASA blends. The phosphates employed for flameproofing normally have to have a certain volatility because, otherwise, they have no flame-retardant properties.

We have now found that chlorine- and bromine-free molding compositions based on mixtures of ABS or ASA with polycarbonate (PC) are particularly flame resistant when they contain a halogen-free graft copolymer whose core (elastomer) contains a vinyl-substituted phosphate which can undergo free-radical (co)polymerization, besides conventional monomers (either a diene such as butadiene or isoprene or an alkyl acrylate with at least 4 carbons in the alkyl).

The present invention therefore primarily relates to a flameproofed chlorine- and bromine-free molding composition with high heat resistance and good notched impact strength, containing, based on the total of A to E, A: at least 40% by weight of at least one halogen-free polycarbonate A B: 5–40% by weight of at least one halogen-free graft copolymer B composed of, based on B, B1: 40–80% by weight of an elastomer B1 with a glass transition temperature below 0° C., composed of, based on B1, B11: at least 50% by weight of a diene or of an at least $C_4$-alkyl acrylate (B11)

B12: 1–40% by weight of a halogen-free phosphorus compound B12 of the formula (I)

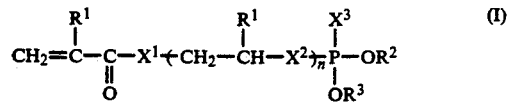

where
$R^1$ is H or $CH_3$
$R^2$ and $R^3$ are each, independently of one another, halogen-free $C_1$–$C_8$-alkyl or halogen-free unsubstituted or substituted $C_6$–$C_{20}$-aryl
$X^1$, $X^2$ and $X^3$ are each O, S, NR (where R is hydrogen or halogen-free $C_1$–$C_8$-alkyl) and n is 0 to 10, B13: with or without up to 5% by weight of another, crosslinking monomer B2: 20–60% by weight of a shell B2 composed of, based on B2, B21: 40–98% by weight of styrene, α-alkylstyrene, nuclear-substituted styrene and/or $C_1$–$C_8$-alkyl (meth)acrylate, B22: 2–60% by weight of (meth)acrylonitrile and/or maleic anhydride, and C: 5–40% by weight of a halogen-free thermoplastic copolymer C composed of, based on C, C1: 50–95% by weight of styrene, α-alkylstyrene, nuclear-substituted styrene and/or $C_1$–$C_8$-alkyl (meth)acrylates, C2: 5–50% by weight of (meth)acrylonitrile and/or maleic anhydride, D: 1–50% by weight of a halogen-free phosphorus compound of the formula (II)

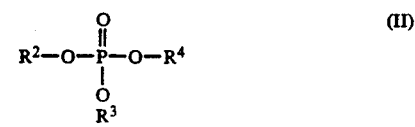

where $R^2$, $R^3$ and $R^4$ each independently have the abovementioned meanings of $R^2$ and $R^3$, E: up to 5% by weight of a polytetrafluoroethylene with a median particle size of 50–2000 nm.

It was surprising that phosphates of the formula (I) when they are included in the grafting base of the graft copolymer confer a good flame-retardant action on the blend and, moreover, the blends have high notched impact strength. Furthermore, the blends have excellent heat resistance and less of a tendency for the low molecular weight organic phosphate to leach out.

The molding composition preferably contains the following proportions of the components, in each case based on the total of A+B+C+D+E:
A: 50–85, in particular 60–70% by weight
B: 5–25, in particular 6–15% by weight
C: 5–25, in particular 10–25% by weight
D: 2–15, in particular 5–15% by weight
E: 0.01–2, in particular 0.1–1% by weight Based on 100 parts by weight of the molding composition according to the invention composed of A to E it is possible, for example, for up to 50 (in particular 20) parts by weight of conventional additives F to be present.

Thermoplastic halogen-free aromatic polycarbonates A suitable according to the invention are those based on diphenols of the formula (II)

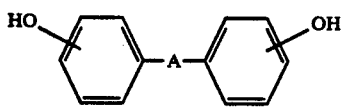

$$\text{(II)}$$

where A is a single bond, $C_1$-$C_3$-alkylene, $C_2$-$C_3$-alkylidene, $C_3$-$C_6$-cycloalkylidene, —S— or —$SO_2$—.

Polycarbonates suitable according to the invention as Component A are both homopolycarbonates and copolycarbonates.

Diphenols of the formula (II) are generally known or can be prepared by known processes.

The preparation of polycarbonates A suitable according to the invention is likewise known and can be carried out, for example, with phosgene by the phasetransfer process or with phosgene by the homogeneous phase process (the pyridine process), the required molecular weight being obtained in each case in a conventional manner by an appropriate amount of known chain terminators. (Concerning polydiorganosiloxanecontaining polycarbonates, see, for example, DE-A 33 34 782).

Examples of suitable chain terminators are phenol, p-tert.-butylphenol and long-chain alkyl phenols such as 4-(1,1,3,3-tetramethylbutyl)phenol (cf. DE-A 28 42 005) or monoalkylphenols or dialkylphenols with a total of 8 to 20 carbons in the alkyl substituents (cf. DE-A 35 06 472) such as p-nonylphenol, 3,5-di-tert.-butylphenol, p-tert.-octylphenol, p-dodecylphenol, 2-(3,5-dimethylheptyl)phenol and 4-(3,5-dimethylheptyl)-phenol.

Polycarbonates A suitable according to the invention have relative viscosities $\eta hd\ rel$ of from 1.10 to 1.50, in particular from 1.25 to 1.40. This corresponds to an average molecular weight $M_w$ of about 10,000–200,000; a molecular weight $M_w$ of 20,000–80,000 is preferred.

Examples of suitable diphenols of the formula (II) are hydroquinone, resorcinol, 4,4'-dihydroxybiphenyl, 2,2-bis(4-hydroxyphenyl)propane, 2,4-bis(4-hydroxyphenyl)-2-methylbutane and 1,1-bis(4-hydroxyphenyl)-cyclohexane.

Preferred diphenols of the formula (II) are 2,2-bis(4-hydroxyphenyl)propane (bisphenol A) and 1,1-bis(4-hydroxyphenyl)cyclohexane.

Suitable polycarbonates A can be branched in a conventional manner, preferably by incorporating from 0.05 to 2.0 mol %, based on the total of diphenols employed, of compounds with three or more functional groups, for example phenolic OH groups.

Preferred polycarbonates are, besides bisphenol A homopolymer, the copolycarbonates of bisphenol A.

For the purpose of the present invention, halogen-free polycarbonates A mean polycarbonates assembled from halogen-free diphenols and halogen-free chain terminators with or without halogen-free branches, but contents in the low ppm range of hydrolyzable chlorine resulting, for example, from the preparation of the polycarbonates with phosgene by the phase-transfer process are not regarded as a halogen content for the purpose of the present invention. Polycarbonates of this type with 60 ppm contents of hydrolyzable chlorine are halogen-free polycarbonates for the purpose of the present invention.

The graft copolymers B are known in principle as ABS or ASA polymers and are modified according to the invention by the incorporation of copolymerizable phosphorus compounds in the core (B11).

The specific graft copolymers B are thus assembled from, in each case based on B, 40–80% by weight of an elastomer component (core) B1 which in turn is assembled from the abovementioned components and monomers B11–B13 according to the invention, and 20–60% by weight of a shell B2.

Graft copolymer B is in the case of an ASA preferably formed of the core B1 composed of an elastomer-forming acrylate such as butyl acrylate or 2-ethylhexyl acrylate in an amount of at least 50% by weight (based on B1), 1–40% by weight of the organic phosphorus compound of the formula (I) and 0.1–5% by weight, based on B1, of a copolymerizable polyfunctional crosslinking monomer. The structure and preparation of ASA polymers are described in principle in DE-A 28 26 925, DE-A 31 49 358 and DE-A 34 14 118. If the invention is to be used to prepare corresponding ABS polymers, on the other hand, the core B1 is composed of, generally, uncrosslinked diene polymers, i.e. polymers of butadiene or isoprene, which are modified by copolymerization with the copolymerizable phosphorus compounds (I).

A shell B2 is attached to this core B1 which has been modified according to the invention, in a conventional manner.

This shell is in each case composed of, in each case based on B2, 50–95% by weight of styrene, α-methylstyrene or a nuclear-alkylated styrene and/or 50–5% by weight of (meth)acrylonitrile, methyl methacrylate or maleic anhydride.

The graft copolymerization can be carried out in a conventional manner in solution, suspension or, preferably, emulsion. The soft phase of the graft copolymer has, in the preferred case of preparation of the rubber and grafting in emulsion, a median particle diameter ($d_{50}$ of the cumulative mass distribution) of, for example, from 80 to 800 nm. The graft copolymerization results, as is known, in at least partial chemical linkage of the polymerizing monomers to the rubber which has already polymerized, the linkage probably taking place on the double bonds present in the rubber. The grafting base modified according to the invention does not differ from known ones in respect of the grafting behavior.

The grafting can also take place in several stages by grafting on first a portion of the monomers forming the shell and subsequently the remainder. The rubber is present in the graft copolymer B in the form of at least partially crosslinked particles with a median particle size of from 50 to 700 nm ($d_{50}$ of the cumulative mass distribution). Since the original particle size is smaller, the particles the rubber are partially enlarged in a conventional manner, e.g. by agglomeration, so that a bimodal distribution (50–180 nm on the one hand and 200–700 nm on the other hand) is obtained. However, a large-particle of rubber dispersion can also be prepared directly by the seed process.

Graft copolymer B can be prepared, for example, by the method described in DE-C 12 60 135.

In the case of one-stage assembly of the shell B2, a mixture of the monomers in the required ratio by weight in the range from 90:10 to 65:35 is polymerized in the presence of the elastomer B1 in a conventional manner (cf., for example, DE-A 28 26 925), preferably in emulsion.

When the shell B2 is assembled in two stages, the 1st stage comprises 20–70%, preferably 25–50%, of the weight of B2. It is prepared using only monoethylenically unsaturated aromatic hydrocarbons with up to 12 carbons (B21). The 2nd stage of the shell comprises 30–80%, in particular 50–75%, of the weight of B2. It is prepared by using mixtures of said monoethylenically unsaturated aromatic hydrocarbons B21 and monoethylenically unsaturated monomers B22 in the ratio B21/B22 of from 98:2 to 40:60, in particular 90:10 to 60:40, by weight.

Monomer mixtures which are particularly preferably employed are styrene and acrylonitrile, α-methylstyrene and acrylonitrile, acrylonitrile and methyl methacrylate, and styrene and maleic anhydride.

The amounts of ungrafted copolymers, i.e. corresponding chemically to Component C, produced in the preparation of the graft copolymer B from the monomers B21 and/or B22 are assigned to Component B for the purpose of the present invention.

The conditions for the graft copolymerization should be chosen so that the resulting particles have sizes of from 60 to 1000 nm ($d_{50}$ of the cumulative mass distribution). Measures to achieve this are known and described, for example, in DE-C 12 60 135 and DE-A 28 26 925.

Component C

Preferred halogen-free copolymers C are those composed of at least one monomer from the series comprising styrene, α-methylstyrene, alkylstyrene, methyl methacrylate with at least one monomer from the series comprising acrylonitrile, methacrylonitrile, methyl methacrylate and maleic anhydride.

Copolymers C are resinous, thermoplastic and rubber-free and are also called matrix in this connection. Particularly preferred copolymers C are those of styrene with acrylonitrile, with or without methyl methacrylate, of α-methylstyrene with acrylonitrile, with or without methyl methacrylate, or of styrene and α-methylstyrene with acrylonitrile, with or without methyl methacrylate, and of styrene and maleic anhydride.

The halogen-free phosphorus compounds D suitable according to the invention are likewise known (for example from Ullmann, Enzyklopädie der technischen Chemie, Vol. 12/1, pages 43 and 136; Beilstein, Vol. 6, page 177).

Examples of phosphorus compounds D suitable according to the invention are tri(2,6-dimethylphenyl) phosphate, triphenyl phosphate, tricresyl phosphate, diphenyl 2-ethyl cresyl phosphate, diphenyl cresyl phosphate and tri(isopropylphenyl) phosphate.

In order to increase the Vicat softening point of the mixtures, it is also possible to employ mixtures of the abovementioned phosphates with, for example, triphenylphosphine oxide or tri (2, 6-dimethylphenyl)phosphine oxide. Also suitable for increasing the Vicat softening point of the mixtures are the phosphates mentioned in DE-A 38 24 356, such as
diphenyl 4-phenylphenyl phosphate
phenyl di(4-phenylphenyl) phosphate
tri(4-phenylphenyl) phosphate
diphenyl 4-benzylphenyl phosphate
phenyl di(4-benzylphenyl) phosphate
tri(4-benzylphenyl) phosphate
phenyl di[4-(1-phenylethyl)phenyl] phosphate
phenyl di[4-(1-methyl-1-phenylethyl)phenyl] phosphate and
phenyl di[4-(1-phenylethyl)-2,6-dimethylphenyl] phosphate.

The polytetrafluoroethylenes E suitable according to the invention are polymers with a fluorine content of 65–76% by weight, preferably 70–76% by weight. Examples include polytetrafluoroethylene, tetrafluoroethylene/hexafluoropropylene copolymers or tetrafluoroethylene copolymers with small amounts of fluorine-free copolymerizable ethylenically unsaturated monomers. Polymers of these types are known. They can be prepared by conventional processes, for example by polymerization of tetrafluoroethylene in aqueous medium with a free radical-forming initiator, for example sodium, potassium or ammonium peroxydisulfate, under superatmospheric pressure and at up to 200° C. (for details, see US-C 2 393 967, for example).

Polytetrafluoroethylenes suitable according to the invention have, for example, a median particle size of 0.05–20 μm, preferably 0.08–10 μm, and a density of 1.2–1.9 g/cm$^3$. Addition of polytetrafluoroethylenes reduces or entirely prevents, in particular, particles dropping off the molding compositions when they are burning.

The aqueous PTFE dispersion can be either absorbed onto the granules in a fluid mixer or incorporated into a melt of Component C in an extruder with vent.

It is also possible for emulsions of Component B to be combined with emulsions of Component F and precipitated using salt solution.

The molding composition can also contain conventional additives F, for example carbon fibers or glass fibers, in particular.

Glass fibers can be of low or high alkali glass or C glass. They are preferably treated with a size and an adhesion promoter. Their diameter is generally from 6 to 20 μm. It is possible to employ both continuous strands (rovings) and chopped strands with a length of 1–10 mm, preferably 3–6 mm.

Examples of other suitable additives are fillers or reinforcing agents such as glass beads, mineral fibers, whiskers, alumina fibers, mica, silica flour, wollastonite etc.; used for a screening action against electromagnetic radiation are, for example, metal flakes (e.g. aluminum flakes), metal powders, metal fibers, metal-coated fillers (e.g. nickel-coated glass fibers) and similar additives.

The molding composition according to the invention can also contain additives which are typical and customary for polycarbonates, SAN polymers and graft copolymers based on ASA or ABS or mixtures thereof. Examples of such additives are dyes, pigments, antistatics, antioxidants and, in particular, the lubricants which may be necessary for further processing the molding composition, e.g. the production of moldings.

Additives not specified in the composition according to the invention (component F) can be added in amounts of up to 80 parts per 100 parts of the total of Components A to E in the mixture.

In this connection, processing aids and stabilizers are normally used in amounts below 2%.

Reinforcing agents such as glass fibers, carbon fibers etc. are normally added in amounts of 5–80% based on the total of A to E.

Preparation of the molding composition

The molding composition according to the invention is prepared by mixing the components. It may be advantageous for some components to be previously mixed. It is also possible to mix the components in solution and to remove the solvent.

Examples of organic solvents suitable for Components A to E are chlorobenzene, mixtures of chlorobenzene and methylene chloride or mixtures of chlorobenzene and aromatic hydrocarbons, e.g. toluene.

The solvent mixtures can be evaporated off, for example, in evaporating extruders.

The mixing of the, for example, dry Components A, B, C, D and E, with or without F, can take place by all conventional methods. However, Components A, B, C, D and E, with or without F, are preferably mixed at 200°-320° C. by the components being extruded, kneaded or rolled together, if necessary after isolation from the solution obtained in the polymerization or from the aqueous dispersion. The products of the graft copolymerization (Component B) obtained in aqueous dispersion can be coagulated, precipitated and partly dehydrated together with Component E, or mixed directly as dispersions with Component C and then with the polycarbonate A and Component D, in which case Components B and E are completely dried during the mixing. It is also possible for the emulsion of Component E to be poured with degassing in an extruder into a melt of Component C, and for the other Components A, B and D to be metered in in the same extruder after the degassing.

Examples of suitable mixing units for the process according to the invention are conventional tumble mixers or stirrers.

Examples of suitable units for the melt compounding are heated internal mixers operating batchwise or continuously, screw compounders with axially oscillating screws, twin screw extruders and heated mixing rolls.

Examples of suitable units for the melt extrusion are single and twin screw extruders.

The molding composition according to the invention can be processed in ways conventional for thermoplastics, e.g. by extrusion, injection molding, calendering, blow molding, compression or sintering; the molding compositions prepared by the process according to the invention are particularly preferably used to produce injection moldings for automobile construction, the building sector, for office machinery, electrical equipment and household appliances.

The parameters used in this application are determined as follows:

The median particle size and the particle size distribution were determined from the cumulative mass distribution. The median particle size is in every case based on weight and was determined using an analytical ultracentrifuge by the method of W. Scholtan and H. Lange, Kolloid-Z. und Z. f. Polymere 250 (1972), 782-796. The ultracentrifuge measurement provides the cumulative mass distribution of the particle diameter in a sample. It is possible to deduce from this the percentage by weight of the particles which have a diameter equal to or smaller than a particular size. The median particle diameter, which is also called the $d_{50}$ of the cumulative mass distribution, is defined as the particle diameter greater than that of 50% by weight of the particles and smaller than that of 50% by weight of the particles. The width of the particle size distribution of the rubber particles is characterized not only by the $d_{50}$ but also by the $d_{10}$ and $d_{90}$ which are derived from the cumulative mass distribution and are defined in a similar way to the $d_{50}$ but relate to 10 and 90% of the particles respectively. The quotient Q $$Q = \frac{d_{90} - d_{10}}{d_{50}}$$

represents a measure of the width of the particle size distribution.

The notched impact strength $a_K$ in $kJ/m^2$ was measured by the DIN 53 453 method on specimens with dimensions $50 \times 6 \times 4$ mm with a rectangular notch 1.3 mm deep and 2 mm wide at 23° C.

The Vicat softening point B/50 was determined on specimens of dimensions $50 \times 6 \times 4$ mm by the DIN 53 460 method.

The relative solution viscosity $\eta_{rel}$ of the polycarbonate employed was measured in a 0.5% strength solution in methylene chloride at 23° C.

The viscosity number VN of the copolymers C was determined in a 0.5% strength solution in dimethylformamide at 23° C.

The flameproofing was tested in a vertical burning test as specified by the Underwriter's Laboratories for assignment to Class UL 94 V-0, V-1 or V-2. A flameproofed thermoplastic is classed V-0 when the following criteria are met: none of 5 specimens with dimensions $127 \times 12.7 \times 1.7$ mm must burn for longer than 10 seconds after two applications of a flame (height 19 mm) for 10 seconds. The total of the burning times after 10 applications of the flame to 5 specimens must not exceed 50 seconds. There must be no dripping of flaming particles, nor complete combustion or glowing combustion persisting for more than 30 seconds. The requirement for Class UL 94 V-1 is that the total of the burning times after 10 applications of a flame to the 5 specimens does not exceed 250 seconds. Glowing combustion must not persist for more than 60 seconds. The other criteria are identical to those mentioned above. The requirements for Class V-2 are identical to those for UL 94 V-1 except that there is dripping of flaming particles.

The products described hereinafter were used to prepare molding compositions according to the invention and compositions for comparative tests.

The product of the formula Ia

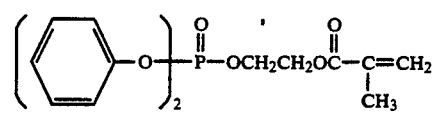

which is obtainable under the name MR$^{260}$ from Daihachi Inc. was used as phosphorus compound B12.

Component A

A commercial polycarbonate based on bisphenol A with a relative solution viscosity of 1.30 was employed as Component A.

Component B

For comparison, a graft copolymer without polymerizable phosphate was prepared as product B-1 as follows:

1.5 parts of a poly(butyl acrylate) latex were mixed with 50 parts of water and 0.1 part of potassium persulfate and then, over the course of 3 hours, on the one hand a mixture of 49 parts of butyl acrylate and 1 part of tricyclodecenyl acrylate, and on the other hand a solution of 0.5 part of the sodium salt of a $C_{12}$–$C_{18}$-paraffinsulfonic acid in 25 parts of water were run in at 60° C. Polymerization was continued for 2 hours after the addition was complete. The resulting latex of the crosslinked poly(butyl acrylate) had a solids content of 40%. The median particle size (based on weight) was found to be 430 nm. The particle size distribution was narrow (Q=0.1).

150 parts of this latex were mixed with 20 parts of styrene and 60 parts of water and stirred while a further 0.03 part of potassium persulfate and 0.05 part of lauryl peroxide were added, and then the mixture was heated at 65° C. for 3 hours. The dispersion obtained from this graft copolymerization was then polymerized with 20 parts of a mixture of styrene and acrylonitrile in the ratio 75:25 for a further 4 hours. The product was then precipitated from the dispersion with a calcium chloride solution at 95° C. and was separated off, washed with water and dried in a stream of hot air. The degree of grafting of the graft copolymer was found to be 35%; the median particle size of the latex was 510 nm.

The following graft copolymer was prepared as product B-2:

1.5 parts of a poly(butyl acrylate) latex were mixed with 50 parts of water and 0.1 part of potassium persulfate and then, over the course of 3 hours, on the one hand a mixture of 43 parts of butyl acrylate, 6 parts of polymerizable phosphate of the formula Ia and 1 part of tricyclodecenyl acrylate, and on the other hand a solution of 0.5 part of the sodium salt of a $C_{12}$–$C_{18}$-paraffin-sulfonic acid in 25 parts of water were run in at 60° C. Polymerization was continued for 2 hours after the addition was complete. The resulting latex of the crosslinked poly(butyl acrylate) had a solids content of 40%. The median particle size (based on weight) of the latex was found to be 430 nm. The particle size distribution was narrow (Q=0.1).

150 parts of this latex were mixed with 20 parts of styrene and 60 parts of water and stirred while a further 0.03 part of potassium persulfate and 0.05 part of lauryl peroxide were added, and then the mixture was heated at 65° C. for 3 hours. The dispersion obtained from this graft copolymerization was then polymerized with 20 parts of a mixture of styrene and acrylonitrile in the ratio 75:25 for a further 4 hours. The product was then precipitated from the dispersion with a calcium chloride solution at 95° C. and was separated off, washed with water and dried in a stream of hot air. The degree of grafting of the graft copolymer was found to be 35%; the median particle size of the latex was 500 rm.

The following graft copolymer was prepared as product B-3:

1.5 parts of a poly(butyl acrylate) were mixed with 50 parts of water and 0.1 part of potassium persulfate and then, over the course of 3 hours, on the one hand a mixture of 37 parts of butyl acrylate, 12 parts of polymerizable phosphate of the formula (Ia) and 1 part of tricyclodecenyl acrylate, and on the other hand a solution of 0.5 part of the sodium salt of a $C_{12}$–$C_{18}$-paraffin-sulfonic acid in 25 parts of water were run in at 60° C. Polymerization was continued for 2 hours after the addition was complete. The resulting latex of crosslinked poly(butyl acrylate) had a solids content of 40%. The median particle size (based on weight) of the latex was found to be 430 nm. The particle size distribution was narrow (Q=0.1).

150 parts of this latex were mixed with 20 parts of styrene and 60 parts of water and stirred while a further 0.03 part of potassium persulfate and 0.05 part of lauryl peroxide were added, and then the mixture was heated at 65° C. for 3 hours. The dispersion obtained from this graft copolymerization was then polymerized with 20 parts of a mixture of styrene and acrylonitrile in the ratio 75:25 for a further 4 hours. The product was then precipitated from the dispersion with a calcium chloride solution at 95° C. and was separated off, washed with water and dried in a stream of hot air. The degree of grafting of the graft copolymer was found to be 35%; the median particle size of the latex was 500 nm.

Component C

A continuous solution polymerization by a process as described, for example, in the Kunststoff-Handbuch, Vieweg-Daumiller, Volume V, (Polystyrene), Carl-HanserVerlag, Munich 1969, page 124, lines 12 et seq., was used to prepare the following copolymer:

SAN (styrene-acrylonitrile copolymer) with a S:AN ratio of 81:19 (% by weight) and a viscosity number VN of 100 ml/g.

Component D: Triphenyl phosphate

Component E: PTFE dispersion with a solids content of 60% by weight and a particle size of 0.23 mm (DuPont, Type 30 N). The density of the sintered solid is 2.3 g/cm³.

TABLE

| Formulation | 1 | 2 | 3 | 4 | 5 | 6 | 7 | 8 | 9 | 10 |
|---|---|---|---|---|---|---|---|---|---|---|
| A | 64.65 | 64.65 | 64.65 | 64.65 | 64.65 | 64.65 | 64.65 | 64.65 | 64.65 | 64.65 |
| B1 | 8 | 8 | — | — | — | — | 8 | — | 8 | — |
| B2 | — | — | 8 | 8 | 8 | 8 | — | — | — | — |
| B3 | — | — | — | — | — | — | 8 | 8 | 8 | 8 |
| C | 15 | 16 | 15 | 16 | 17 | 18 | 15 | 16 | 17 | 18 |
| D | 12 | 11 | 12 | 11 | 10 | 9 | 12 | 11 | 10 | 9 |
| E | 0.35 | 0.35 | 0.35 | 0.35 | 0.35 | 0.35 | 0.35 | 0.35 | 0.35 | 0.35 |
| MFI | 59 | 53 | 121 | 109 | 90 | 78 | 170 | 152 | 137 | 107 |
| Vicat | 86.2 | 90.5 | 84.7 | 87.8 | 91.1 | 94.6 | 83.5 | 85.7 | 89.3 | 92.4 |
| UL 94 | V-0 | V-1 | V-0 | V-0 | V-1 | V-1 | V-0 | V-0 | V-0 | V-2 |

We claim:

1. A molding composition containing, based on the total of A to E,

A: at least 40% by weight of at least one halogen-free polycarbonate A

B: 5–40% by weight of at least one halogen-free graft copolymer B composed of, based on B, B1: 40–80% by weight of an elastomer B1 with a glass transition temperature below 0° C., composed of, based on B1, B11: at least 50% by weight of a diene or of an at least $C_4$-alkyl acrylate (B11)

B12: 1–40% by weight of a halogen-free phosphorus compound B12 of the formula (I)

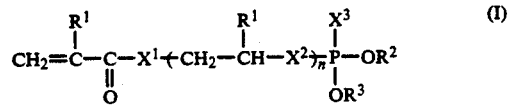

where $R^1$ is H or $CH_3$ $R^2$ and $R^3$ are each, independently of one another, halogen-free $C_1$–$C_8$-alkyl or halogen-free unsubstituted or substituted $C_6$–$C_{20}$-aryl $X^1$, $X^2$ and $X^3$ are each O, S, NR (where R is hydrogen or halogen-free $C_1$-$C_8$-alkyl) and n is 0 to 10, B2: 20–60% by weight of a shell B2 composed of, based on B2, B21: 40–98% by weight of styrene, α-alkylstyrene, nuclear-substituted styrene and/or $C_1$-$C_8$-alkyl (meth)acrylate, B22: 2–60% by weight of (meth)acrylonitrile and/or maleic anhydride, and C: 5–40% by weight of a halogen-free thermoplastic copolymer C composed of, based on C, C1: 50–95% by weight of styrene, α-alkylstyrene, nuclear-substituted styrene and/or $C_1$-$C_8$-alkyl (meth)acrylates, C2: 5–50% by weight of (meth)acrylonitrile and/or maleic anhydride, D: 1–50% by weight of a halogen-free phosphorus compound of the formula (II)

$$R^2-O-\underset{\underset{R^3}{O}}{\overset{\overset{O}{\|}}{P}}-O-R^4 \qquad (II)$$

where $R^2$, $R^3$ and $R^4$ each independently have the abovementioned meanings of $R^2$ and $R^3$, E: up to 5% by weight of a polytetrafluoroethylene with a median particle size of 50–2000 nm.

* * * * *